US009551896B2

(12) United States Patent
Nimura

(10) Patent No.: US 9,551,896 B2
(45) Date of Patent: Jan. 24, 2017

(54) LIQUID CRYSTAL DEVICE AND ELECTRONIC APPARATUS INCLUDING A PLURALITY OF MICROLENSES SEPARATED BY A LIQUID CRYSTAL LAYER

(71) Applicant: Seiko Epson Corporation, Tokyo (JP)

(72) Inventor: Toru Nimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

(21) Appl. No.: 14/161,144

(22) Filed: Jan. 22, 2014

(65) Prior Publication Data

US 2014/0218664 A1 Aug. 7, 2014

(30) Foreign Application Priority Data

Feb. 5, 2013 (JP) .................................. 2013-020160

(51) Int. Cl.
*G02F 1/1335* (2006.01)
*G02B 3/04* (2006.01)
*G02B 3/00* (2006.01)

(52) U.S. Cl.
CPC ........... *G02F 1/133526* (2013.01); *G02B 3/04* (2013.01); *G02B 2003/0093* (2013.01)

(58) Field of Classification Search
CPC ................. G02F 1/133526; G02B 2003/0093; G02B 3/02; G02B 3/04
USPC .......................................................... 349/95
See application file for complete search history.

(56) References Cited

U.S. PATENT DOCUMENTS

| 5,187,599 | A | * | 2/1993 | Nakanishi et al. | ............. 349/95 |
| 5,430,562 | A | * | 7/1995 | Fushimi | ............... H04N 9/3105 |
| | | | | | 348/E9.027 |
| 5,557,432 | A | * | 9/1996 | Yokota | .............................. 349/5 |
| 5,583,669 | A | * | 12/1996 | Fushimi et al. | .................... 349/5 |
| 5,680,186 | A | * | 10/1997 | Watanabe et al. | ............. 349/95 |
| 5,764,318 | A | * | 6/1998 | Kurematsu et al. | .............. 349/5 |
| 6,169,594 | B1 | * | 1/2001 | Aye | ......................... G02B 5/045 |
| | | | | | 349/196 |
| RE38,175 | E | * | 7/2003 | Ariki et al. | ...................... 349/57 |
| 2004/0012734 | A1 | * | 1/2004 | Yamanaka | ............ G02B 3/0031 |
| | | | | | 349/95 |
| 2005/0063068 | A1 | * | 3/2005 | Sakurai | .............. G02F 1/133526 |
| | | | | | 359/626 |

(Continued)

FOREIGN PATENT DOCUMENTS

| JP | 04-134321 A | 5/1992 |
| JP | 07-013161 A | 1/1995 |
| JP | 2006-184673 A | 7/2006 |

*Primary Examiner* — Paisley L Arendt
(74) *Attorney, Agent, or Firm* — ALG Intellectual Property, LLC

(57) ABSTRACT

A liquid crystal device includes a first substrate that is arranged on a light input side; a second substrate that is arranged on a light output side; a liquid crystal layer that is arranged between the first and second substrates; a first microlens that is provided on the first substrate such that an optical axis is tilted to a normal line direction of the first substrate; and a second microlens that is provided on the second substrate such that an optical axis is tilted to a normal line direction of the second substrate, in which a focal point of the first microlens is located on a curved surface of the second microlens, or on the light output side rather than the curved surface.

6 Claims, 8 Drawing Sheets

(56) References Cited

U.S. PATENT DOCUMENTS

| | | | | |
|---|---|---|---|---|
| 2005/0248705 A1* | 11/2005 | Smith | .................. | G02B 5/3016 349/124 |
| 2007/0216851 A1* | 9/2007 | Matsumoto | ............... | G02F 1/29 349/200 |
| 2011/0109818 A1* | 5/2011 | Uneda | ............... | G02F 1/133526 349/5 |

* cited by examiner

CONVENTIONAL ART

LIQUID CRYSTAL DEVICE AND ELECTRONIC APPARATUS INCLUDING A PLURALITY OF MICROLENSES SEPARATED BY A LIQUID CRYSTAL LAYER

BACKGROUND

1. Technical Field

The present invention relates to, for example, a liquid crystal device and an electronic apparatus.

2. Related Art

As a liquid crystal device which includes a liquid crystal layer between a pair of substrates, for example, a liquid crystal light bulb of a projector has been known. In such a liquid crystal device, it is desired to realize a high use efficiency of light. Accordingly, for example, a configuration in which light input to a liquid crystal device is condensed, and an improvement of a substantial opening rate of the liquid crystal device is made by including a microlens at least on one side of a pair of substrates has been known.

On the other hand, a liquid crystal device of a vertical alignment (VA) mode has been known as a method which is excellent in light transmittance while securing a wide viewing angle, or a good response speed. The liquid crystal device of the VA mode is configured so that, a liquid crystal of which dielectric anisotropy is negative is typically used therein, liquid crystal molecules are approximately vertically aligned with respect to the inner surface of a substrate in a state in which an electric field is not applied, and the liquid crystal molecules are aligned approximately in parallel to the inner surface of the substrate by being tilted in a state in which the electric field is applied. The liquid crystal device of the VA mode is configured so as to become a state in which the liquid crystal molecules typically are slightly inclined to a predetermined orientation in an initial aligning state, that is, so as to have a pretilt angle which is less than 90°, and tilting orientation of the liquid crystal molecules is controlled by defining an azimuth angle of the pretilt angle in advance.

As the liquid crystal device of the VA mode a liquid crystal device (liquid crystal display device) which includes a liquid crystal layer in which a liquid crystal molecule has an azimuth angle of a pretilt angle (axial direction of high contrast), and a lens which has a focal point in a direction which goes along an azimuth angle of a pretilt angle of the liquid crystal molecule has been proposed (for example, refer to JP-A-4-134321). In the liquid crystal device which is described in JP-A-4-134321, it is possible to improve contrast by including lenses on both of a pair of substrates which interpose a liquid crystal layer therebetween, by condensing light which is input on one lens, by refracting an optical axis of light which is condensed in a direction which goes along the azimuth angle of the pretilt angle, and by turning the light which has penetrated the liquid crystal layer by being refracted back to as light which is parallel by refracting the light again on the other lens.

However, in the liquid crystal device which is described in JP-A-4-134321, since a focal point of a lens on a counter substrate (counter electrode substrate) side to which light is input is located on a liquid crystal layer, light which is input to a position separated from an optical axis of the lens, and is refracted goes toward the focal point of the lens which is located on the liquid crystal layer, and crosses an optical axis of the lens. Since the optical axis of the lens goes along an azimuth angle of a pretilt angle of a liquid crystal molecule, the light which crosses the optical axis of the lens in the liquid crystal layer largely deviates from the azimuth angle of the pretilt angle. Accordingly, there is a problem in that transmissivity of the light which penetrates the liquid crystal layer decreases, and it is difficult to sufficiently obtain an effect of improving contrast. In addition, in the liquid crystal device which is described in JP-A-4-134321, since two lenses are provided outside a counter substrate and an element substrate (pixel electrode substrate), a distance between the lens and a light-blocking layer becomes large. For this reason, there is a problem in that a light amount which passes through an opening portion of the light-blocking layer becomes small, or there is a concern that tilted light may be input to a neighboring pixel region.

In addition, when a light-blocking region of an element substrate which includes a switching element such as a thin film transistor (TFT), and a light-blocking layer of the counter substrate (light-blocking mask) are provided at a position which is planarly overlapped, part of light of which optical axis is tilted along the azimuth angle of the pretilt angle on the lens on the input side is blocked on a light-blocking layer of the element substrate on the output side. Due to this, since the part of light which has penetrated the liquid crystal layer is not used, there is a problem in that a use efficiency of light decreases.

SUMMARY

The invention can be realized in the following forms, or application examples.

Application Example 1

A liquid crystal device according to this application example includes a first substrate; a second substrate which is arranged so as to face the first substrate; a liquid crystal layer which is arranged between the first and second substrates, and in which a liquid crystal molecule has a pretilt angle of less than 90° in a state in which an electric field is not applied; an electrode which applies the electric field to the liquid crystal layer in each pixel; a first microlens which is provided on the liquid crystal layer side of the first substrate in each of the pixels, condenses light which is input from a normal line direction of the first substrate, and is approximately parallel, and causes an optical axis of the condensed light to be tilted to an azimuth angle side of the pretilt angle of the liquid crystal molecule; and a second microlens which is provided on the liquid crystal layer side of the second substrate in each pixel, causes the tilted optical axis of the light to face a normal line direction of the second substrate, and turns the condensed light back to light which is approximately parallel, in which a focal point of the first microlens in each of the pixels is located on a curved surface of the second substrate, or a side which is closer to the light output side than the curved surface.

According to the configuration of the application example, input light is condensed in each pixel by the first microlens which is arranged on the light input side, and the optical axis of the condensed light is tilted so that the optical axis goes along the azimuth angle side of the pretilt angle which is in a direction of a long axis of the liquid crystal molecule in an initial aligning state in which the electric field is not applied. Here, since a focal point of the first microlens is located on a curved surface of the second microlens, or the side which is closer to the light output side than the curved surface, light which goes toward the focal point by being input to a position which is separated from the optical axis of the first microlens penetrates the liquid crystal layer without crossing the optical axis of the first microlens, and is input to the second microlens. Accordingly, it is possible to cause large amount of light to penetrate the liquid crystal layer so as to go along the long axis direction of the liquid crystal molecule, compared to a case in which a focal point of a lens on the input side is in the liquid crystal layer, and light which is refracted toward the focal point of the lens crosses the optical axis of the lens, as the liquid crystal device which is described in JP-A-4-134321. As a result, it is possible to improve contrast of the liquid crystal device.

Application Example 2

It is preferable that the first microlens have a positive refractive power, and the second microlens have a negative refractive power, in the liquid crystal device according to the application example.

According to the configuration of the application example, since the first microlens has the positive refractive power, input light is refracted toward the focal point of the first microlens. For this reason, it is possible to cause part of light in the input light which is blocked by a light-blocking layer to be condensed in a pixel region, and to improve a use efficiency of the light. In addition, since the second microlens has the negative refractive power, the microlens causes the light which is condensed on the first microlens to be refracted outside. For this reason, it is possible to suppress uneven illuminance when performing projection on a screen or the like, since it is possible to turn the light which is condensed on the first microlens back to light which is approximately parallel.

Application Example 3

It is preferable that the liquid crystal device according to the above described application example include a first light-blocking layer which is provided closer to the liquid crystal layer side than the first microlens side of the first substrate, and has a first opening portion corresponding to a region in each of the pixels, and a second light-blocking layer which is provided closer to the liquid crystal layer side than the second microlens of the second substrate, and has a second opening portion corresponding to a region in each of the pixels, in which an edge portion of the first opening portion of the first light-blocking layer, and an edge portion of the second opening portion of the second light-blocking layer be separated by approximately the same distance from the optical axis of the light which passes through the first and second opening portions by being tilted on the first microlens in one direction which crosses a normal line direction of the first substrate.

According to the configuration of the application example, the edge portion of the first opening portion and the edge portion of the second opening portion are separated by approximately the same distance with respect to the optical axis of the light which passes through the first opening portion of the first light-blocking layer and the second opening portion of the second light-blocking layer by being tilted on the first microlens. For this reason, almost all of the light which passes through the first opening portion of the first light-blocking layer by being tilted on the first microlens passes through the second opening portion without being blocked by the second light-blocking layer. In this manner, it is possible to improve a use efficiency of light in the liquid crystal device.

Application Example 4

An electronic apparatus according to this application example includes the liquid crystal device in the above described application examples.

According to the configuration of the application example, it is possible to provide an electronic apparatus in which contrast of an image which is projected on a screen is high, and uneven illuminance is reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments in which the invention is embodied will be described with reference to drawings. Drawings which will be used are displayed by being appropriately enlarged, reduced, or exaggerated so that a portion which will be described is in a recognizable state. In addition, in some cases, elements excluding constituent elements which are necessary for descriptions will be omitted.

In addition, in the following embodiment, when describing "on substrate", for example, the case denotes a case of being arranged so as to be in contact with a substrate thereon, a case of being arranged on the substrate through another component, or a case of being arranged on the substrate so that a part is in contact with the substrate thereon and a part is arranged through another component.

First Embodiment

Liquid Crystal Device

Here, an active matrix-type liquid crystal device which includes a thin film transistor (TFT) as a switching element of a pixel will be described as an example. The liquid crystal device is, for example, a device which can be preferably used as an optical modulation element (liquid crystal light bulb) of a projection-type display device (projector), which will be described later.

Figure 1:
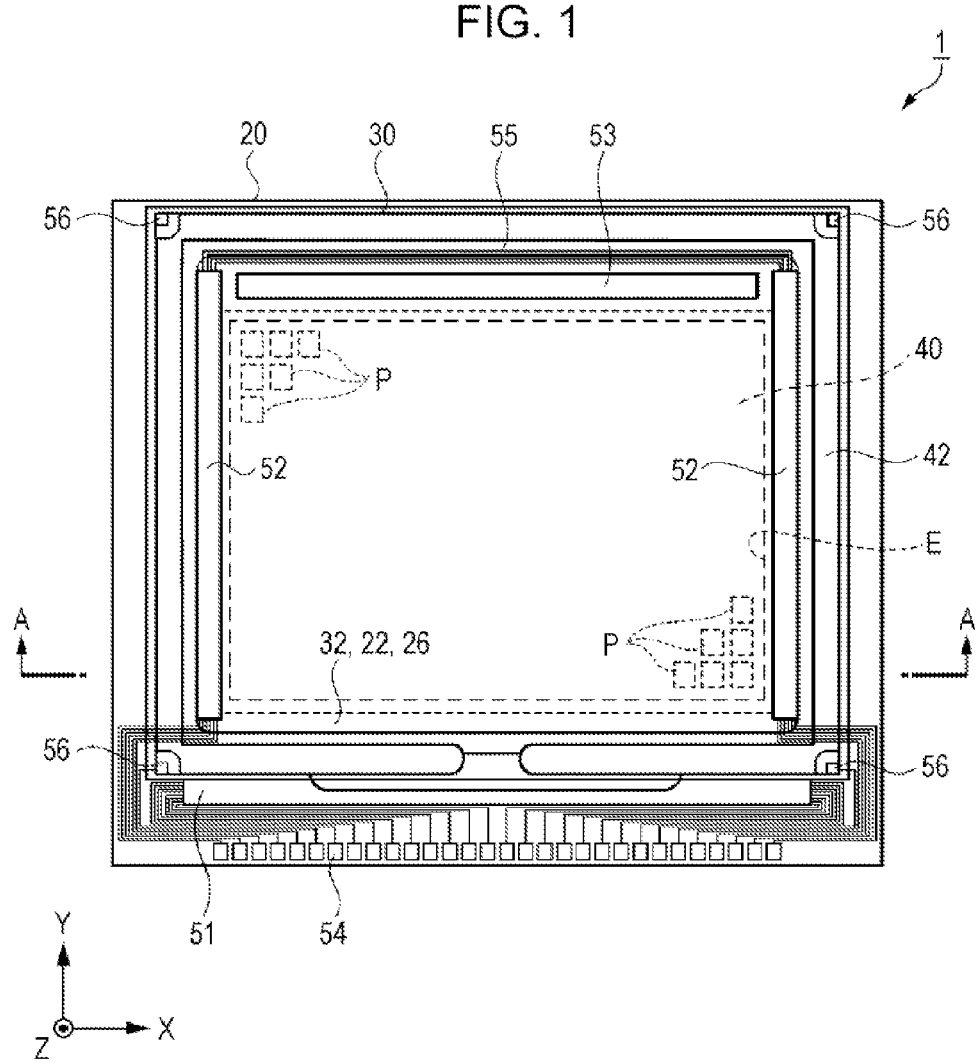
FIG. 1 is a schematic plan view which illustrates a configuration of a liquid crystal device according to a first embodiment.
Figure 2:
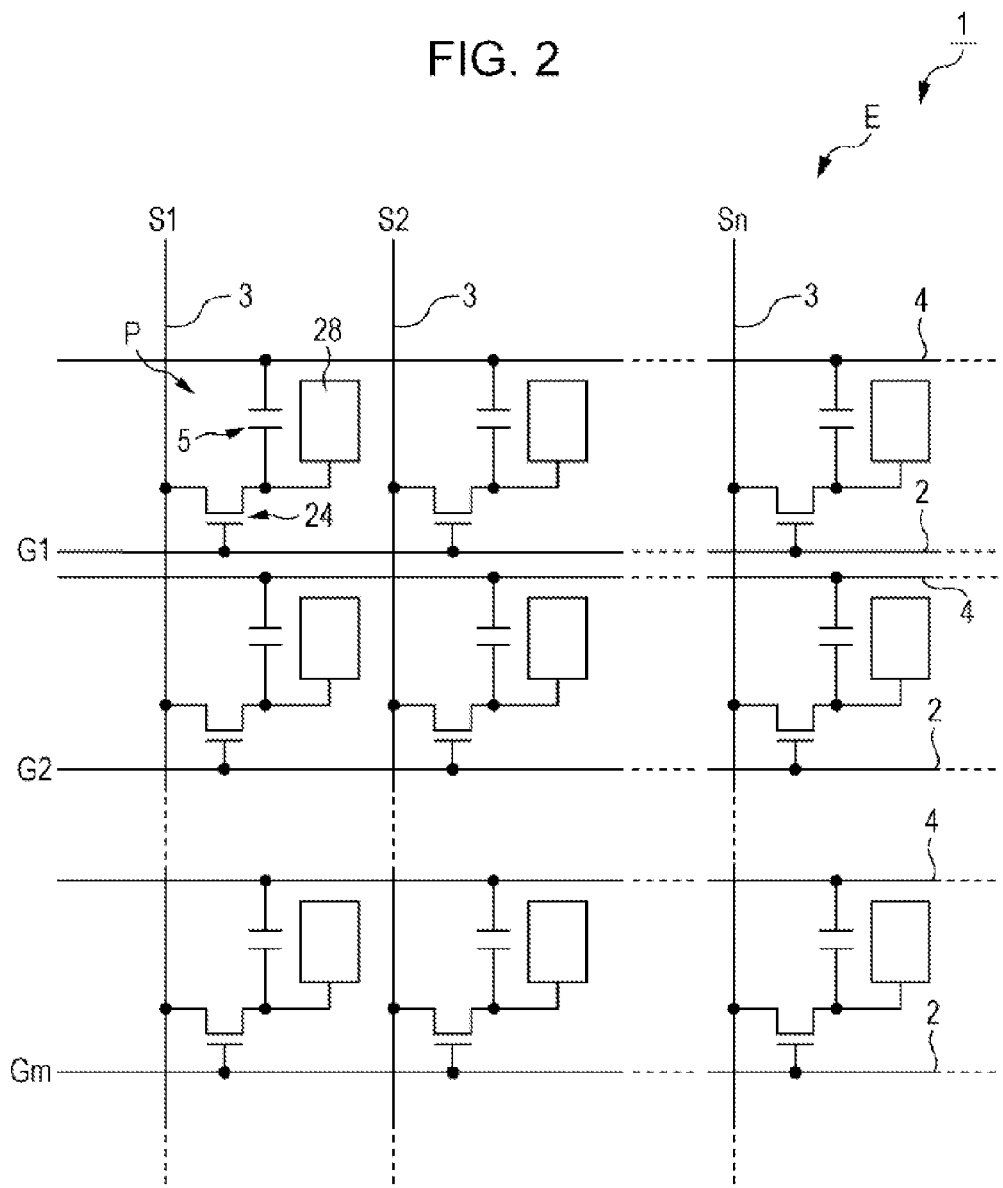
FIG. 2 is an equivalent circuit diagram which illustrates an electrical configuration of the liquid crystal device according to the first embodiment.
Figure 3:
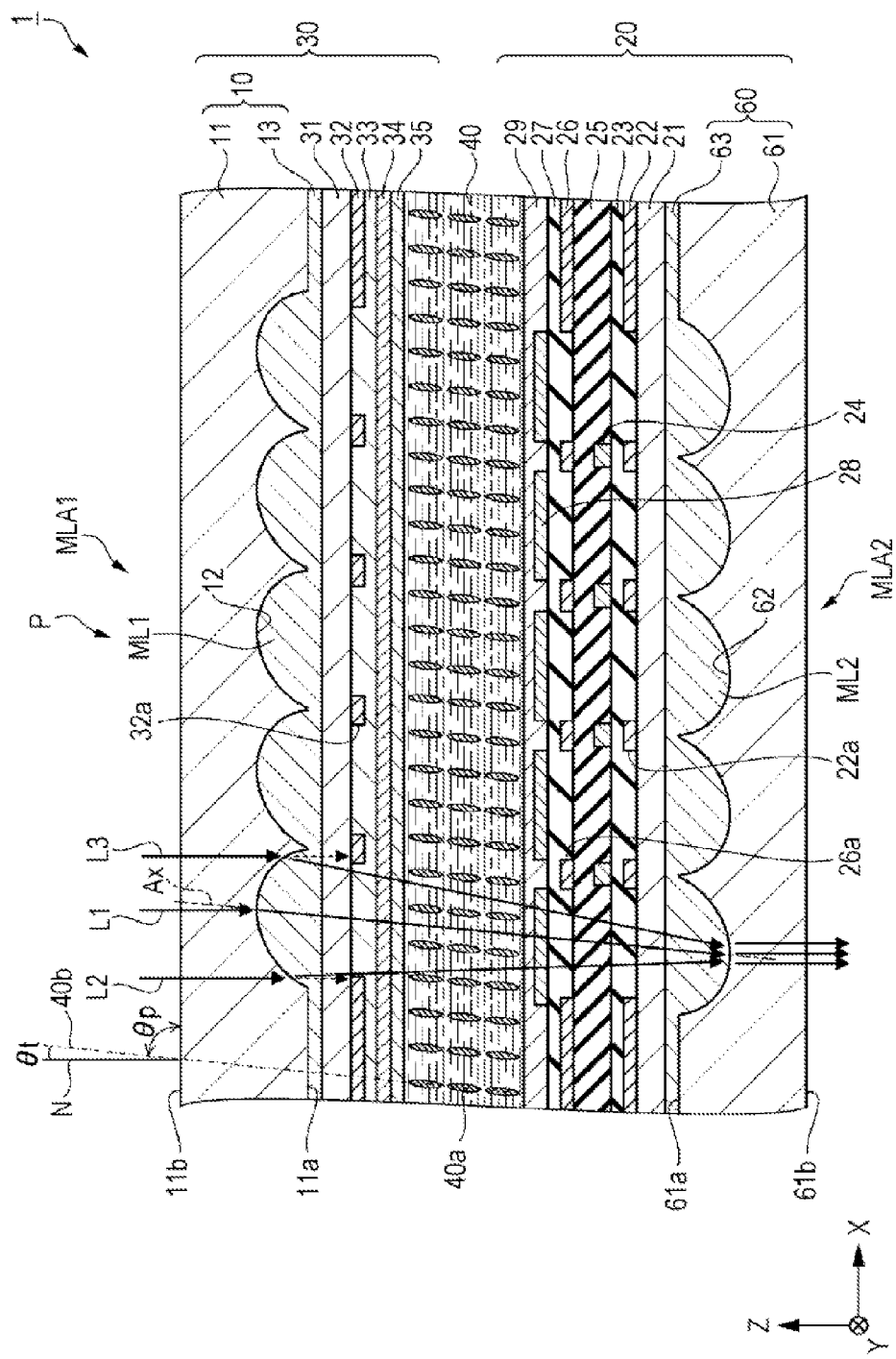
FIG. 3 is a schematic cross-sectional view which illustrates a configuration of the liquid crystal device according to the first embodiment.

First, a liquid crystal device according to a first embodiment will be described with reference to FIGS. 1, 2, 3, 4A and 4B, and 5A and 5B. FIG. 1 is a schematic plan view which illustrates a configuration of the liquid crystal device according to the first embodiment. FIG. 2 is an equivalent circuit diagram which illustrates an electrical configuration of the liquid crystal device according to the first embodiment. FIG. 3 is a schematic cross-sectional view which illustrates a configuration of the liquid crystal device according to the first embodiment. More specifically, FIG. 3 is a schematic cross-sectional view which is taken along line A-A in FIG. 1.

Figure 4A:
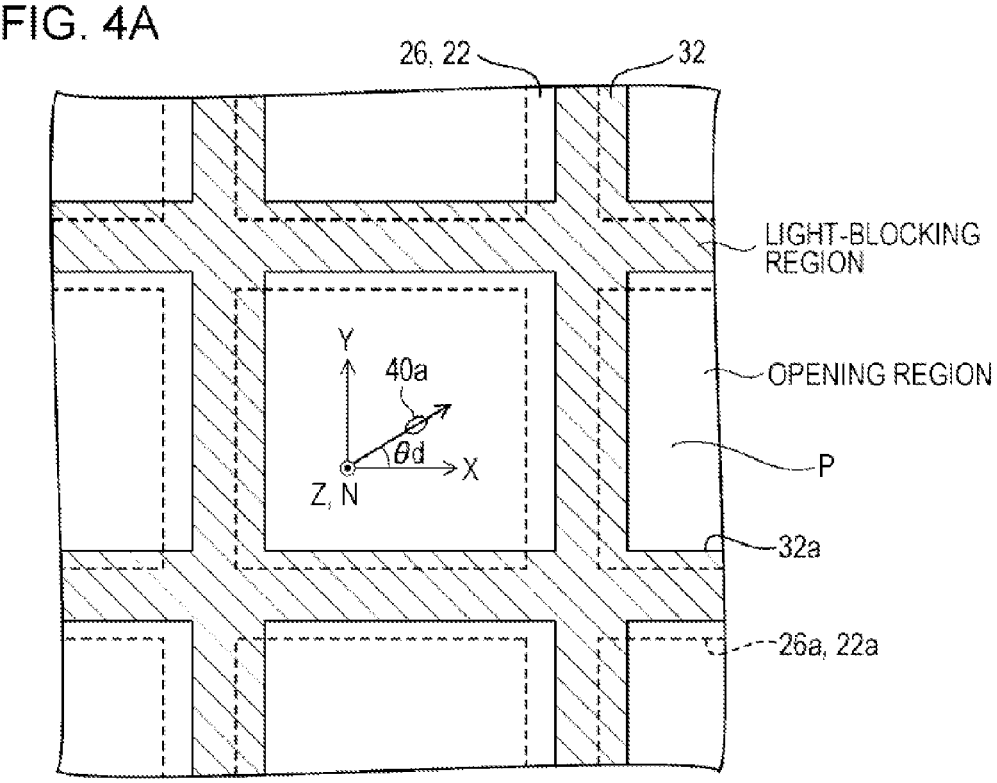
FIGS. 4A and 4B are diagrams which illustrate a positional relationship of a light-blocking layer of the liquid crystal device according to the first embodiment.
Figure 4B:
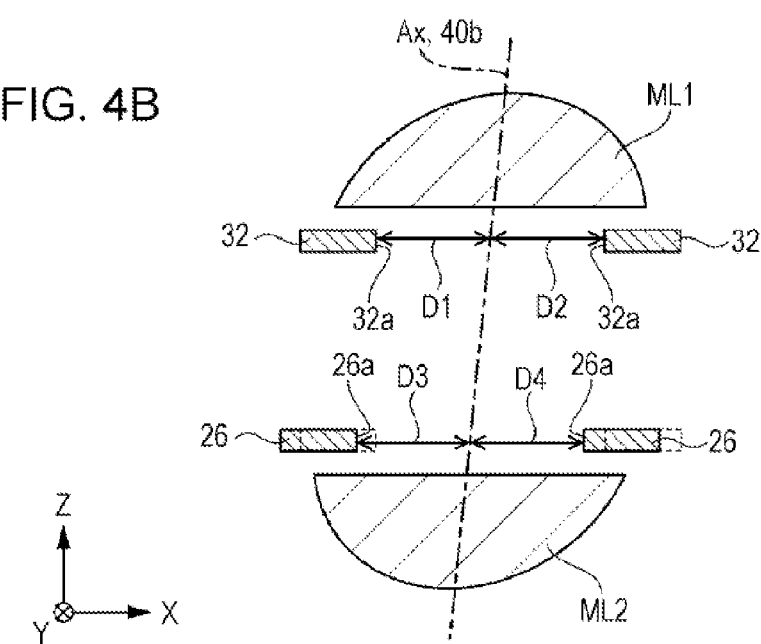
Figure 5A:
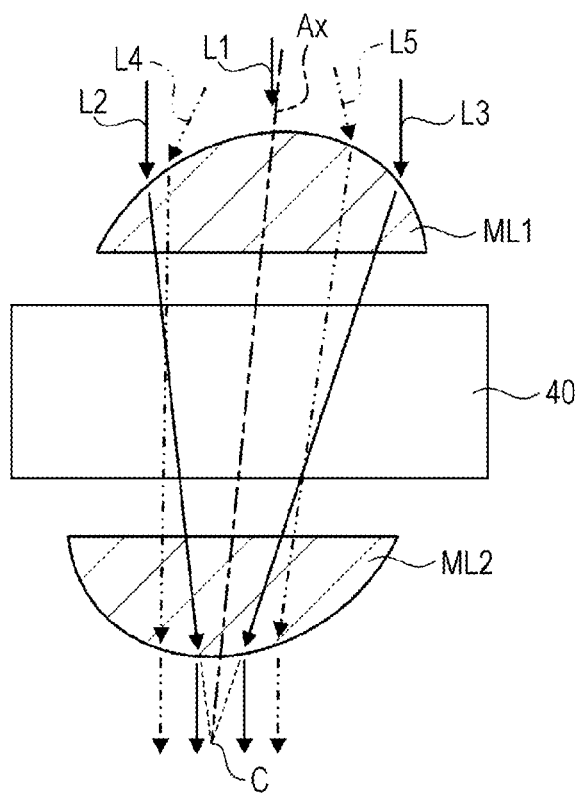
FIGS. 5A and 5B are diagrams which describe an operation of a microlens of the liquid crystal device according to the first embodiment.
Figure 5B:
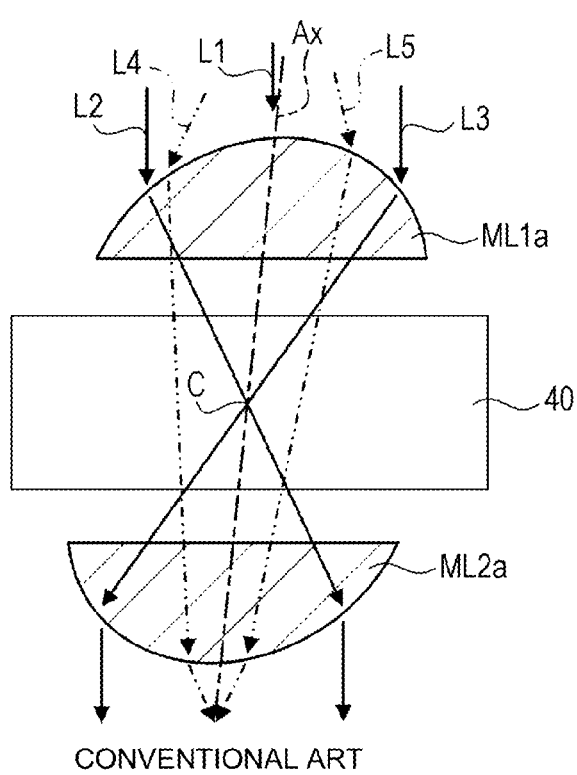

In addition, FIGS. 4A and 4B are diagrams which illustrate a positional relationship of a light-blocking layer of the liquid crystal device according to the first embodiment. Specifically, FIG. 4A is a schematic plan view which illustrates the positional relationship of the light-blocking layer, and FIG. 4B is a schematic cross-sectional view which illustrates the positional relationship of the light-blocking layer. FIGS. 5A and 5B are diagrams which describe operations of a microlens of the liquid crystal device according to the first embodiment. Specifically, FIG. 5A is a schematic cross-sectional view of the liquid crystal device according to the first embodiment, and FIG. 5B is a schematic cross-sectional view of an example of a liquid crystal device in the related art.

As illustrated in FIGS. 1 and 3, the liquid crystal device 1 according to the first embodiment includes a counter substrate 30 as a first substrate, an element substrate 20 as a second substrate which is arranged so as to face the counter substrate 30, and a liquid crystal layer 40 which is arranged between the counter substrate 30 and the element substrate 20. As illustrated in FIG. 1, the element substrate 20 is larger than the counter substrate 30, and both of the substrates are bonded through a sealing material 42 which is arranged in a frame shape along an edge portion of the counter substrate 30.

The liquid crystal layer 40 is enclosed in a space which is surrounded with the counter substrate 30, the element substrate 20, and the sealing material 42. The sealing material 42 is formed by an adhesive such as a heat curable epoxy resin, or a UV curable epoxy resin, for example. Spacers (not shown) which constantly maintain a gap between the element substrate 20 and the counter substrate 30 are mixed in the sealing material 42.

A light-blocking layer 32 (22, 26) which has a peripheral edge portion of a frame shape is provided inside the sealing material 42 which is arranged in the frame shape. The light-blocking layer 32 (22, 26) is formed by, for example, light-blocking metal, metal oxide, or the like. The inside of the light-blocking layer 32 (22, 26) becomes a display area E in which a plurality of pixels P are arranged. The pixel P has an approximately rectangular shape, for example, and is arranged in a matrix shape.

The display area E is an area which substantially contributes to a display in the liquid crystal device 1. The light-blocking layer 32 (22, 26) is provided in a lattice shape, for example, so as to planarly partition the plurality of pixels P in the display area E. In addition, the liquid crystal device 1 may include a dummy area which is provided so as to surround the periphery of the display area E, and does not substantially contribute to the display.

On the side which is opposite to the display area E of the sealing material 42 which is formed along a first side of the element substrate 20, a data line driving circuit 51 and a plurality of external connection terminals 54 are provided along the first side. In addition, an inspection circuit 53 is provided on the display area E side of the sealing material 42 which goes along a second side facing the first side. In addition, a scanning line driving circuit 52 is provided inside the sealing material 42 which goes along the other two sides which are orthogonal to these two side portions, and face each other.

A plurality of wirings 55 which connect the two scanning line driving circuits 52 are provided on the display area E side of the sealing material 42 on the first side on which the inspection circuit 53 is provided. Wiring which is connected to these data line driving circuit 51 and the scanning line driving circuit 52 is connected to the plurality of external connection terminals 54. In addition, a vertical conduction unit 56 for performing an electrical conduction between the element substrate 20 and the counter substrate 30 is provided at a corner portion of the counter substrate 30. In addition, arrangement of the inspection circuit 53 is not limited to this, and the inspection circuit may be provided at a position which goes along the inside of the sealing material 42 between the data line driving circuit 51 and the display area E.

In the following descriptions, a direction which goes along the first side portion at which the data line driving circuit 51 is provided is set to the X direction as the first direction, and a direction which goes along the other two side portions which are orthogonal to the first side portion, and face each other is set to the Y direction as the second direction. The X direction is a direction which goes along line A-A of FIG. 1. In addition, a direction which is orthogonal to the X direction and the Y direction, and goes to the upper side in FIG. 1 is set to the Z direction. In addition, in the specification, when the liquid crystal device 1 is viewed from a direction of a normal line N (Z direction) of a face 11b (refer to FIG. 3) as an outside surface of the counter substrate 30, it is referred to as a "planar view".

As illustrated in FIG. 2, a scanning line 2 and a data line 3 are formed so as to cross each other in the display area E, and a pixel P is provided corresponding to the cross of the scanning line 2 and the data line 3. A pixel electrode 28 and a TFT 24 as a switching element are provided in each of the pixels P.

A source electrode (not shown) of the TFT 24 is electrically connected to the data line 3 which extends from the data line driving circuit 51. Image signals (data signal) S1, S2, . . . , Sn are supplied from the data line driving circuit 51 (refer to FIG. 1) to the data line 3 in a line sequential manner. A gate electrode (not shown) of the TFT 24 is a part of the scanning line 2 which extends from the scanning line driving circuit 52. Scanning signals G1, G2, . . . , Gn are supplied from the scanning line driving circuit 52 to the scanning line 2 in the line sequential manner. A drain electrode (not shown) of the TFT 24 is electrically connected to the pixel electrode 28.

The image signals S1, S2, . . . , Sn are written in the pixel electrode 28 through the data line 3 at a predetermined timing, by making the TFT 24 be in an ON state only for a certain period of time. The image signal of a predetermined level which is written in a liquid crystal layer 40 through the pixel electrode 28 in this manner is maintained in a liquid crystal capacitor which is formed between the pixel electrode and a common electrode 34 (refer to FIG. 3) provided in the counter substrate 30 for a certain period of time.

In addition, a storage capacitor 5 is formed between a capacity line 4 which is formed along the scanning line 2 and the pixel electrode 28 in order to prevent the maintained image signals S1, S2, . . . , Sn from leaking, and the storage capacitor is arranged in parallel to the liquid crystal capacitor. In this manner, when a voltage signal is applied to a liquid crystal of each pixel P, an aligning state of the liquid crystal is changed due to a voltage level which is applied thereto. In this manner, light which is input to the liquid crystal layer 40 (refer to FIG. 3) is modulated, and it is possible to perform a grayscale display.

The liquid crystal which configures the liquid crystal layer 40 can modulate light, and perform a grayscale display by being changed in aligning or order of a molecule assembly due to the voltage level which is applied. For example, in a case of a normally white mode, transmissivity with respect to input light is reduced according to a voltage which is applied in a unit of each pixel P. In a case of a normally black mode, transmissivity with respect to input light is increased according to a voltage which is applied in the unit of each pixel P, and light with contrast corresponding to an image signal is output from the liquid crystal device 1, as a whole.

As illustrated in FIG. 3, the liquid crystal device 1 according to the embodiment includes a microlens substrate 10 in the counter substrate 30, and a microlens array substrate 60 in the element substrate 20. A microlens ML1 as a first microlens is provided in the microlens substrate 10. A microlens ML2 as a second microlens is provided in the microlens array substrate 60.

The counter substrate 30 includes the microlens substrate 10, an optical path length adjusting layer 31, a light-blocking layer 32 as a first light-blocking layer, a protection layer 33, the common electrode 34, and an alignment film 35. The microlens substrate 10 includes a substrate 11 and lens layer 13. The microlens substrate 10 is arranged so that the face 11a of the substrate 11 becomes the liquid crystal layer 40 side (element substrate 20 side).

The substrate 11 is formed of a material having optical transmissivity such as, glass, or quartz, for example. A plurality of concave portions 12 are provided on the face 11a side of the substrate 11. Each of the concave portions 12 is arranged corresponding to each pixel P. The concave portion 12 is formed in a curved surface shape which is tapered toward the face 11b side of the substrate 11. The curved surface of the concave portion 12 is not a spherical shape, and has a shape which is asymmetric to a normal line N of the substrate 11 which passes through a center of a region of the pixel P. In other words, a bottom of the concave portion 12 is located by being deviated from the center of the region of the pixel P.

In addition, as illustrated in FIG. 4A, an opening portion 32a of the light-blocking layer 32, and opening portions 22a and 26a as opening regions of the light-blocking layers 22 and 26 are regions of the pixel P. The center of the pixel P region indicates planar center positions of the opening portions 32a, 22a, and 26a.

As illustrated in FIG. 3, the lens layer 13 is formed so as to bury the concave portion 12 of the substrate 11. The lens layer 13 is formed of a material having optical transparency, and an optical refractive index which is different from that of the substrate 11. According to the embodiment, the lens layer 13 is formed of an inorganic material of which optical refractive index is higher than that of the substrate 11. As such an inorganic material, there are, for example, silicon oxynitride (SiON), alumina ($Al_2O_3$), borosilicate glass, or the like. According to the embodiment, the lens layer 13 is formed of silicon oxynitride (SiON).

Due to the lens layer 13 which buries the concave portion 12 of the substrate 11, a microlens ML1 is configured. Since the optical refractive index of the lens layer 13 is higher than that of the substrate 11, the microlens ML1 has a positive refractive power. That is, light which is input from the face 11b side of the substrate 11 is refracted toward a focal point C of the microlens ML1 (refer to FIG. 5A) on a bonded interface between the substrate 11 and the lens layer 13. The focal point C of the microlens ML1 is located on a curved surface of a concave portion 62 of a microlens ML2, or on the light output side (face 61b side of substrate 61) rather than the curved surface.

The lens layer 13 which buries the concave portion 12 has a curved surface shape which is swollen toward the face 11b side of the substrate 11 to which light is input. Since the curved surface of the concave portion 12 has an asymmetric shape with respect to the normal line N of the substrate 11 which passes through the center of the pixel P region, an apex of the lens layer 13 corresponding to the bottom of the concave portion 12 is located by being deviated from the center of the pixel P region. A straight line which passes through the apex of the lens layer 13 and the focal point C is set to an optical axis Ax of the microlens ML1. The optical axis Ax of the microlens ML1 is configured so as to be approximately parallel to a long axis direction 40b (pretilt angle θp) of a liquid crystal molecule 40a, which will be described later.

Each of the microlenses ML1 is arranged in responding to each pixel P. In addition, a microlens array MLA1 is configured by the plurality of microlenses ML1. Since an inorganic material which is used as a lens material of the lens layer 13 has excellent resistance with respect to light or a high temperature compared to a resin, it is possible to improve the reliability of the microlens array MLA1 (microlens ML1).

The optical path length adjusting layer 31 is provided so as to cover the microlens array substrate 10. The optical path length adjusting layer 31 is formed of an inorganic material having approximately the same optical refractive index as that of the substrate 11, for example. The optical path length adjusting layer 31 performs planarization of the surface of the microlens array substrate 10, and has a function of aligning the focal point of the microlens ML1 at a desired position. According to the embodiment, the focal point of the microlens ML1 is located on a curved surface of the microlens ML2 (concave portion 62), which will be described later, or on the light output side (face 61b side of substrate 61) rather than the curved surface.

The light-blocking layer 32 is configured of a material having a light-blocking property such as molybdenum (Mo), tungsten (W), titanium (Ti), titanium nitride (TiN), and chromium (Cr), for example. The light-blocking layer 32 is formed in a lattice shape, and has the opening portion 32a as the first opening portion. The inside of the opening portion 32a is a region through which light passes.

The protection layer 33 is provided so as to cover the optical path length adjusting layer 31 and the light-blocking layer 32. The common electrode 34 is provided so as to cover the protection layer 33. The common electrode 34 is formed by straddling the plurality of pixels P. The common electrode 34 is formed of a transparent conductive film such as Indium Tin Oxide (ITO), or Indium Zinc Oxide (IZO), for example. The alignment film 35 is provided so as to cover the common electrode 34.

The element substrate 20 includes the microlens array substrate 60, an optical path length adjusting layer 21, the light-blocking layer 22, an insulating layer 23, the TFT 24, an insulating layer 25, the light-blocking layer 26 as the second light-blocking layer, an insulating layer 27, the pixel electrode 28, and an alignment film 29. The microlens array substrate 60 includes a substrate 61, and a lens layer 63. The microlens array substrate 60 is arranged so that a face 61a of the substrate 61 becomes a liquid crystal layer 40 side (counter substrate 30 side).

The substrate 61 is formed of a material having optical transparency such as glass or quartz, for example. A plurality of concave portions 62 are formed on the face 61a side of the substrate 61. Each of the concave portions 62 is arranged in responding to each pixel P. The concave portion 62 is formed in a curved surface shape which is tapered toward the face 61b side of the substrate 61. Similarly to the concave portion 12, the curved surface of the concave portion 62 has an asymmetric shape with respect to the normal line N of the substrate 11 which passes through the center of the region of the pixel P. In addition, a bottom of the concave portion 62 is located by being deviated to a side which is opposite to the bottom of the concave portion 12 from the center of the pixel P region.

A lens layer 63 is formed so as to bury the concave portion 62 of the substrate 61. The lens layer 63 is formed of a material which has optical transparency, and has an optical refractive index which is different from that of the substrate 61. According to the embodiment, the lens layer 63 is formed of an inorganic material of which optical refractive index is lower than that of the substrate 61. As the material of the lens layer 63, it is possible to use the same inorganic material as that of the lens layer 13. An apex of the microlens ML2 which is formed in the lens layer 63 is located by being deviated from a center of a region of the corresponding pixel P to the side which is opposite to the apex of the microlens ML1 formed in the lens layer 13.

The microlens ML2 is configured by the lens layer 63 which buries the concave portion 62 of the substrate 61. Since the optical refractive index of the lens layer 63 is lower than that of the substrate 61, the microlens ML2 has a negative refractive power. Accordingly, a focal point of the microlens ML2 (not shown) is located on the light input side (liquid crystal layer 40 side) rather than the lens layer 63.

The lens layer 63 which buries the concave portion 62 has a curved surface shape which is swollen toward the face 61b side of the substrate 61 from which light is output. When a straight line which passes through the apex (bottom of concave portion 62) and the focal point of the lens layer 63 in the microlens ML2 is set to an optical axis (not shown) of the microlens ML2, light which is input from the liquid crystal layer 40 side in parallel to the optical axis of the microlens ML2 is radiated on a bonded interface between the lens layer 63 and the substrate 61 as if the light is output from the focal point of the microlens ML2. It is preferable that the optical axis of the microlens ML2 approximately match the optical axis Ax of the microlens ML1.

Each microlens ML2 is arranged in responding to each pixel P, similarly to the microlens ML1. In addition, a microlens array MLA2 is configured by the plurality of microlenses ML2.

In addition, when the liquid crystal device 1 has a dummy area at the periphery of the display area E (refer to FIG. 1), a configuration may be possible in which the microlens ML1 and the microlens ML2 are also provided in the dummy area. When adopting such a configuration, since flatness of the microlens array substrate 10 and the microlens array substrate 60 are improved in an outer edge portion of the display area E, and at the periphery thereof, it is possible to make the layer thickness of the liquid crystal layer 40 be more uniform, and to make optical conditions such as refraction of input light the same, and an image quality of the liquid crystal device 1 can be improved.

The optical path length adjusting layer 21 is provided so as to cover the microlens array substrate 60. The optical path length adjusting layer 21 is formed of an inorganic material having approximately the same optical refractive index as that of the substrate 61, for example. The optical path length adjusting layer 21 performs planarization of the surface of the microlens array substrate 60, and has a function of aligning the focal point of the microlens ML2 at a desired position.

The light-blocking layer 22 is provided on the optical path length adjusting layer 21. The light-blocking layer 22 is formed in a lattice shape so as to be overlapped with the light-blocking layer 26 which is the upper layer when viewed planarly (refer to FIG. 4A). The light-blocking layers 22 and 26 are configured of a material having a light-blocking property, similarly to the light-blocking layer 32. The light-blocking layers 22 and 26 are arranged so as to interpose the TFT 24 therebetween in a thickness direction (Z direction) of the element substrate 20.

By providing the light-blocking layers 22 and 26, light input to the TFT 24 is suppressed. The light-blocking layer 22 has an opening portion 22a, and the light-blocking layer 26 has an opening portion 26a as the second opening portion. The inside of the opening portion 22a and the opening portion 26a become regions through which light passes. In addition, the light-blocking layers 22 and 26 are arranged at positions which are deviated in the X and Y directions with respect to the light-blocking layer 32 when viewed planarly (refer to FIG. 4A). A positional relationship between the light-blocking layers 22 and 26 and the light-blocking layer 32 will be described later.

The insulating layer 23 is provided so as to cover the optical path length adjusting layer 21 and the light-blocking layer 22. The insulating layer 23 is formed of an inorganic material such as $SiO_2$, for example. The TFT 24 is provided on the insulating layer 23. The TFT 24 is a switching element which drives the pixel electrode 28. Though it is not illustrated, the TFT 24 is configured of a semiconductor layer, a gate electrode, a source electrode, a drain electrode, and the like.

The gate electrode is formed in a region in which the electrode is overlapped with a channel region of the semiconductor layer in the element substrate 20 when viewed planarly, through a part of the insulating layer 25 (gate insulating film). Though it is not shown, the gate electrode is electrically connected to the scanning line 2 (refer to FIG. 2) which is arranged on the lower layer side through a contact hole, and the TFT 24 is subject to an ON/OFF control when a scanning signal is applied to the gate electrode.

The insulating layer 25 is provided so as to cover the insulating layer 23 and the TFT 24. The insulating layer 25 is formed of an inorganic material such as $SiO_2$, for example. The insulating layer 25 includes a gate insulating film which insulates between the semiconductor layer and the gate electrode of the TFT 24. Due to the insulating layer 25, an irregularity on the surface which is caused by the TFT 24 is relieved. The light-blocking layer 26 is provided on the insulating layer 25. In addition, an insulating layer 27 which is formed of an inorganic material is provided so as to cover the insulating layer 25 and the light-blocking layer 26.

The pixel electrode 28 is provided in responding to the pixel P on the insulating layer 27. The pixel electrode 28 is arranged in a region in which the electrode is overlapped with the opening portion 22a of the light-blocking layer 22 and the opening portion 26a of the light-blocking layer 26 when viewed planarly. The pixel electrode 28 is formed of a transparent conductive film such as Indium Tin Oxide (ITO), or Indium Zinc Oxide (IZO), for example. An electric field is applied to the liquid crystal layer 40 for each pixel P between the pixel electrode 28 and the common electrode 34. The alignment film 29 is provided so as to cover the pixel electrode 28.

In addition, the TFT 24, the electrode which supplies an electric signal to the TFT 24, or wiring such as the scanning line 2 and the data line 3 (refer to FIG. 2) is provided in a region in which these elements are overlapped with the light-blocking layers 22 and 26 when viewed planarly. The TFT 24 is provided, for example, at an intersection point of a lattice of the light-blocking layers 22 and 26, that is, at four corners of the pixel P. In addition, a configuration may be possible in which these electrode, wiring, and the like, also function as the light-blocking layers 22 and 26.

The liquid crystal layer 40 is enclosed between the alignment film 35 on the counter substrate 30 side and the alignment film 29 on the element substrate 20 side. The liquid crystal device 1 is a liquid crystal device of a so-called Vertical Alignment (VA) mode. The liquid crystal layer 40 is configured of, for example, a liquid crystal having negative dielectric anisotropy, and is configured of a negative nematic liquid crystal, or the like. A plurality of liquid crystal molecules 40a are arranged in the liquid crystal layer 40 so as to be in a predetermined aligning state.

More specifically, in a state in which the electric field is not applied between the common electrode 34 and the pixel electrode 28 (state in which electric field is not applied), the liquid crystal layer 40 becomes a liquid crystal layer of a vertical aligning mode in which the liquid crystal molecule 40a aligns approximately in parallel to the normal line N of the substrate 11 in the display area E. The alignment of the liquid crystal molecule 40a in the state in which the electric field is not applied is referred to as an initial alignment. In addition, when the electric field is applied between the common electrode 34 and the pixel electrode 28, the liquid crystal molecule 40a is aligned so as to be tilted toward a predetermined azimuth angle according to the field intensity thereof.

In the state in which the electric field is not applied, a long axis direction 40b of the liquid crystal molecule 40a is not completely parallel to the normal line N of the substrate 11, and there is a slight angle difference θt. The pretilt angle θp of the liquid crystal molecule 40a is 90°−θt. Accordingly, the pretilt angle θp is less than 90°. It is preferable that the pretilt angle θp usually be set in a range of 85° to less than 90°, and be in a range of 87° to 89°.

The pretilt angle θp is different depending on the type of the liquid crystal molecule 40a, the thickness of the liquid crystal layer 40 (cell gap), and types or structures of the alignment films 35 and 29. For example, according to the embodiment, as the alignment films 35 and 29, oblique evaporated films which are formed by evaporating $SiO_2$ at an angle of approximate 50° with respect to the surface of the counter substrate 30 and the element substrate 20, respectively, are used.

In addition, as illustrated in FIG. 4A, the liquid crystal molecule 40a is tilted to an orientation which is denoted by an azimuth angle θd with respect to the X and Y directions when viewed planarly from the direction of the normal line N (Z direction). The azimuth angle θd of the pretilt of the liquid crystal molecule 40a is determined by an evaporating direction of the oblique evaporated film which is used in the alignment films 35 and 29, and is aligned over the entire liquid crystal layer 40 (in a region of alignment film 35 in which the azimuth angle is overlapped with at least the opening portion 22a in display area E when viewed planarly, and in a region of alignment film 29 in which the azimuth angle is overlapped with the opening portion 26a in display area E when viewed planarly).

Due to the azimuth angle θd of the pretilt of the liquid crystal molecule 40a which is set in this manner, the liquid crystal molecule 40a is aligned so as to be tilted toward the orientation of the azimuth angle θd, in a state in which a predetermined voltage is applied between the common electrode 34 and the pixel electrode 28. In this manner, it is possible to control an aligning direction of liquid crystal molecule 40a when the electric field is applied, and to prevent an undesirable optical property due to a disorder in the aligning direction of the liquid crystal molecule 40a from appearing.

In addition, as illustrated in FIG. 4A, the opening portion 22a of the light-blocking layer 32 which is provided on the counter substrate 30, and the opening portion 26a of the light-blocking layer 26 (and light-blocking layer 22) which is provided on the element substrate 20 are arranged by being deviated in the X and Y directions along the azimuth angle θd of the pretilt of the liquid crystal molecule 40a when viewed planarly.

Operation of Microlens

Subsequently, operations of the microlenses ML1 and ML2 in the liquid crystal device 1 according to the first embodiment will be described. As illustrated in FIG. 3, in the liquid crystal device 1, light is input from the counter substrate 30 (face 11b of substrate 11) side which includes the microlens ML1, penetrates the liquid crystal layer 40, and is output from the element substrate 20 (face 61b of substrate 61) side which includes the microlens ML2.

Since the microlens ML1 has a positive refractive power as described above, the microlens has a function of condensing light which is approximately parallel, and is input along the normal line N direction from the face 11b side of the substrate 11 by refracting the light toward the focal point C of the microlens ML1 (refer to FIG. 5A) in each pixel P.

In addition, since the microlens ML1 has an asymmetric shape with respect to the normal line N of the substrate 11 through which the curved surface of the concave portion 12 passes the center of the pixel P region, the microlens has a function of tilting an optical axis of the condensed light toward the optical axis Ax of the microlens ML1 from the normal line N direction. Since the optical axis Ax of the microlens ML1 is configured approximately in parallel to the long axis direction 40b (pretilt angle θp) of the liquid crystal molecule 40a, the light which is condensed in the microlens ML1 penetrates the liquid crystal layer 40 by being tilted toward the long axis direction 40b of the liquid crystal molecule 40a.

On the other hand, since the microlens ML2 has the negative refractive power as described above, the microlens has a function of radiating the light which is condensed in the microlens ML1, and penetrates the liquid crystal layer 40. In addition, in the microlens ML2, since the curved surface of the concave portion 62 has the same asymmetric shape as that of the concave portion 12, and the apex of the lens layer 63 is located on the side which is opposite to the apex of the lens layer 13 with respect to the normal line N which passes through the center of the pixel P region, the lens has a function of tilting an optical axis of the input light to the normal line N direction. In this manner, the microlens ML2 causes the optical axis of the light which is tilted in the microlens ML1 to go toward the normal line N direction, and takes a role of turning the condensed light back to light which is approximately parallel. In addition, the normal line N direction of the substrate 61 approximately matches the normal line direction of the substrate 11.

For example, light L1 which is input in the vicinity of the apex of the microlens ML1 (lens layer 13) among light beams which are input to the microlens ML1 from the face 11 side of the substrate 11, and are parallel to the normal line N of the substrate 11 is tilted toward the optical axis Ax of the microlens ML1. In addition, the light L1 goes straight along the optical axis Ax of the microlens ML1, and is input to the liquid crystal layer 40.

The light L1 which is input to the liquid crystal layer 40 penetrates the liquid crystal layer 40 along the long axis direction 40b of the liquid crystal molecule 40a, that is, along the azimuth angle θd of the pretilt (refer to FIG. 4A) of the liquid crystal molecule 40a, and is input to the microlens ML2. Thereafter, the light L1 is output in the direction which is approximately parallel to the normal line N from the vicinity of the apex of the microlens ML2 (lens layer 63).

On the other hand, when it is assumed that light beams L2 and L3 which are present outside the light L1, and are input to the peripheral portion of the microlens ML1 from a region which is overlapped with the light-blocking layer 32 when viewed planarly go straight as are, the light beams are blocked by the light-blocking layer 32 as denoted by a dotted line, however, the light beams are condensed toward a focal point due to a presence of the microlens ML1. In the liquid crystal device 1, it is also possible to make the light beams L2 and L3 which are blocked by the light-blocking layer 32 when going straight in this manner penetrate the liquid crystal layer 40 by being input to the opening portion 32a of the light-blocking layer 32 using the condensing operation of the microlens ML1. In this manner, since it is possible to make a light amount which is output from the element substrate 20 side large, a use efficiency of light can be improved.

In addition, optical axes of the light beams L2 and L3 which are input to the peripheral portion of the microlens ML1, and are condensed are tilted toward the optical axis Ax (long axis direction 40b of liquid crystal molecule 40a) of the microlens ML1, and penetrate the liquid crystal layer 40. Accordingly, it is possible to improve contrast of the liquid crystal device 1. In addition, the tilted optical axes of the light beams L2 and L3 are caused to go toward the normal line N direction of the microlens ML2, and the condensed light beams L2 and L3 are turned back to light beams which are approximately parallel. In this manner, it is possible to reduce uneven illuminance which is caused by a tilted optical axis of light, when the light which is output from the liquid crystal device 1 is projected onto a screen 130 (refer to FIG. 8), or the like.

Here, as illustrated in FIG. 4A, the light-blocking layer 32 which is provided in the counter substrate 30, and the light-blocking layer 26 (and light-blocking layer 22) which is provided in the element substrate 20 are deviated in the direction which is denoted by the azimuth angle θd of the pretilt of the liquid crystal molecule 40a when viewed planarly. More specifically, when the pretilt of the liquid crystal molecule 40a is set to a three-dimensional vector, the opening portion 32a of the light-blocking layer 32 is relatively deviated with respect to the opening portion 26a (and opening portion 22a) of the light-blocking layer 26 (and light-blocking layer 22) by a distance corresponding to an X direction component of the three-dimensional vector in the X direction, and is relatively deviated by a distance corresponding to a Y direction component of the three-dimensional vector in the Y direction.

A positional relationship between the opening portion 32a of the light-blocking layer 32 and the opening portion 26a of the light-blocking layer 26 in the X direction with respect to the optical axis Ax of the microlens ML1 will be described with reference to the schematic cross-sectional view which is illustrated in FIG. 4B. Here, descriptions will be made by assuming that the opening portion 32a of the light-blocking layer 32 and the opening portion 26a of the light-blocking layer 26 have approximately the same shape and size. In addition, the optical axis Ax of the microlens ML1 is assumed to approximately match the long axis direction 40b of the liquid crystal molecule 40a.

As illustrated in FIG. 4B, in the opening portion 32a, a distance between an edge portion on the left in the X direction and the optical axis Ax with respect to the optical axis Ax of the microlens ML1 is set to a distance D1, and a distance between an edge portion on the right in the X direction and the optical axis Ax with respect to the optical axis Ax of the microlens ML1 is set to a distance D2. In addition, in the opening portion 26a, when a distance between an edge portion on the left in the X direction and the optical axis Ax with respect to the optical axis Ax is set to a distance D3, and a distance between an edge portion on the right in the X direction and the optical axis Ax with respect to the optical axis Ax is set to a distance D4, D1 and D3 are approximately the same, and D2 and D4 are approximately the same. That is, the edge portion of the opening portion 32a and the edge portion of the opening portion 26a are separated from the optical axis Ax of the microlens ML1 by approximately the same distance.

In addition, though it is not shown, a positional relationship between the opening portion 32a of the light-blocking layer 32 and the opening portion 26a of the light-blocking layer 26 in the Y direction with respect to the optical axis Ax of the microlens ML1 is also the same. Accordingly, a relative position of the opening portion 32a of the light-blocking layer 32 with respect to the optical axis Ax of the microlens ML1, and a relative position of the opening portion 26a of the light-blocking layer 26 with respect to the optical axis Ax of the microlens ML1 are approximately the same.

As denoted by a dotted line in FIG. 4B, when it is assumed that the opening portion 26a of the light-blocking layer 26 and the opening portion 32a of the light-blocking layer 32 are in a positional relationship of being overlapped with each other when viewed planarly, the distance becomes D3<D1. In such a case, part of light which is tilted toward the optical axis Ax in the microlens ML1, and penetrates the liquid crystal layer 40 (refer to FIG. 3) by passing through the opening portion 32a of the light-blocking layer 32 along the optical axis Ax is not used by being blocked by the light-blocking layer 26.

In contrast to this, in the liquid crystal device 1 according to the embodiment, almost all of light beams which have penetrated the liquid crystal layer 40 by being tilted toward the optical axis Ax in the microlens ML1 by passing through the opening portion 32a of the light-blocking layer 32 along the optical axis Ax pass through the opening portion 26a without being blocked by the light-blocking layer 26. Accordingly, by arranging the light-blocking layers 26 and 32 so as to be deviated in responding to the pretilt of the liquid crystal molecule 40a, it is possible to improve a use efficiency of light in the liquid crystal device 1.

In addition, in the above descriptions, it is assumed that the opening portion 32a of the light-blocking layer 32 and the opening portion 26a of the light-blocking layer 26 have approximately the same shape and size, however, the shapes and the sizes of both may be different when it is a configuration in which many light beams which pass through the opening portion 32a of the light-blocking layer 32 by being tilted toward the optical axis Ax in the microlens ML1 can pass through the opening portion 26a of the light-blocking layer 26. For example, a ratio of D1 to D2, and a ratio of D3 to D4 may be approximately the same.

Subsequently, effects of the microlenses ML1 and ML2 which are included in the liquid crystal device 1 according to the embodiment will be further described compared to a configuration of a liquid crystal device in the related art. FIG. 5B schematically illustrates a configuration which is the same as that of the liquid crystal device which is described in JP-A-4-134321 as an example of a liquid crystal device in the related art.

The liquid crystal device in the related art which is illustrated in FIG. 5B includes two microlenses of a microlens ML1a which is arranged on the light input side, and a microlens ML2a which is arranged on the side from which light is output, similarly to the liquid crystal device 1 which is illustrated in FIG. 5A. Both the microlenses ML1a and ML2a have a positive refractive power. In addition, a focal point C of the microlens ML1a which is arranged on the light input side is located in a liquid crystal layer 40. In addition, an optical axis Ax of the microlens ML1a is set so as to approximately match a long axis direction of a liquid crystal molecule (not shown) of the liquid crystal layer 40.

In the liquid crystal device in the related art which is illustrated in FIG. 5B, light L1 which is input to the vicinity of an apex of the microlens ML1a penetrates the liquid crystal layer 40 along the long axis direction of the liquid crystal molecule, that is, along an azimuth angle of the pretilt of the liquid crystal molecule. However, since light beams L2 and L3 which are input to peripheral portions separated from the apex of the microlens ML1a are refracted toward the focal point C of the microlens ML1a which is located in the liquid crystal layer 40, an angle between the light beams and the optical axis Ax of the microlens ML1a which goes along the long axis direction of the liquid crystal molecule becomes large in the liquid crystal layer 40. Accordingly, the light beams L2 and L3 which penetrate the liquid crystal layer 40 deviate from the azimuth angle of the pretilt angle of the liquid crystal molecule. As a result, in the liquid crystal device in the related art, there is a problem in that light penetrates the liquid crystal layer 40 in the pixel P which should display black, and it is difficult to obtain an effect of improving contrast.

In contrast to this, in the liquid crystal device 1 which is illustrated in FIG. 5A, the light beams L2 and L3 which are input to the peripheral edge portions which are separated from the apex of the microlens ML1 are refracted toward the curved surface of the microlens ML2 (concave portion 62), or a focal point C of the microlens ML1 which is located on the light output side rather than the curved surface. For this reason, since optical axes of the light beams L2 and L3 which are condensed in the microlens ML1 are caused to penetrate the liquid crystal layer 40 by being moved closer to the azimuth angle θd of the pretilt of the liquid crystal molecule 40a, it is possible to improve transmissivity of the light beams L2 and L3 which penetrate the liquid crystal layer 40, and to improve contrast of an image which is projected onto a screen.

In addition, in the liquid crystal device 1, light beams which are not parallel to the normal line N of the substrate 11, similar to light beams L4 and L5, are also caused to penetrate the liquid crystal layer 40 by being moved closer to the azimuth angle θd of the pretilt of the liquid crystal molecule 40a, and are caused to be output approximately in parallel to the normal line N similarly to the light beams L2 and L3 by the microlens ML2, it is possible to reduce uneven illuminance of an image which is projected onto a screen.

In addition, in the liquid crystal device which is described in JP-A-4-134321, two lenses are provided on the outside of the counter substrate and the element substrate, and in which a distance between the lens and the light-blocking layer is large compared to the liquid crystal device 1 in which the microlenses ML1 and ML2 are provided inside the counter substrate 30 and the element substrate 20 (on liquid crystal layer 40 side). For this reason, in the configuration of the liquid crystal device which is described in JP-A-4-134321, there is a problem in that the amount of light which passes through the opening portion of the light-blocking layer is reduced, or oblique light is input to a neighboring pixel region. In the liquid crystal device 1, since distances between the microlenses ML1 and ML2 and the light-blocking layers 32 and 22 are small compared to the liquid crystal device which is described in JP-A-4-134321, it is possible to increase the amount of light which passes through, and to prevent the oblique light from being input into the neighboring pixel region.

In addition, when the liquid crystal device in the related art which is illustrated in FIG. 5B is configured so that the microlens ML2a is moved to the light input side rather than the focal point C of the microlens ML1a, and the microlens ML2a has a negative refractive power, the device has the same configuration as that of the liquid crystal device 1 according to the embodiment. In other words, according to the configuration of the liquid crystal device 1, it is possible to make the distance between the microlens ML1 and microlens ML2 small compared to the liquid crystal device having the configuration in the related art, and as a result, it is possible to make the liquid crystal device 1 thin by making the distance between the counter substrate 30 and the element substrate 20 small.

Method of Manufacturing Microlens Array Substrate

Subsequently, methods of manufacturing the microlens array substrates 10 and 60 according to the first embodiment will be described with reference to FIGS. 6A to 7C. FIGS. 6A to 7C are schematic cross-sectional views which illustrate a method of manufacturing the microlens array substrate according to the first embodiment. Specifically, each figure of FIGS. 6A to 7C is a schematic cross-sectional view which is taken along line A-A of FIG. 1.

In addition, though it is not shown, in the manufacturing process of the microlens array substrates 10 and 60, processing is performed on a large substrate (mother substrate) from which a plurality of the microlens array substrates 10 and 60 can be obtained, and the plurality of the microlens array substrates 10 and 60 are obtained by cutting the mother substrate finally, and by separating the mother substrate into pieces. Accordingly, in each process, which will be described below, the processing is performed on the mother substrate in a state of not yet being separated into pieces, however, processing with respect to the individual microlens array substrate 10 and the microlens array substrate 60 in the mother substrate will be described here. In addition, since the microlens array substrates 10 and 60 are manufactured using the same manufacturing method, a manufacturing method of the microlens array substrate 10 will be described here.

Figure 6A:
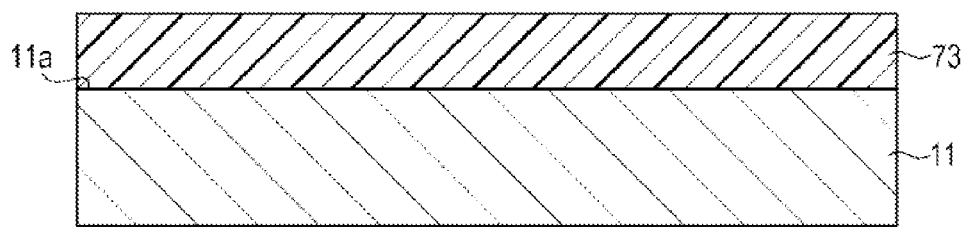
FIGS. 6A to 6C are schematic cross-sectional views which illustrate a method of manufacturing a microlens array substrate according to the first embodiment.
Figure 6B:
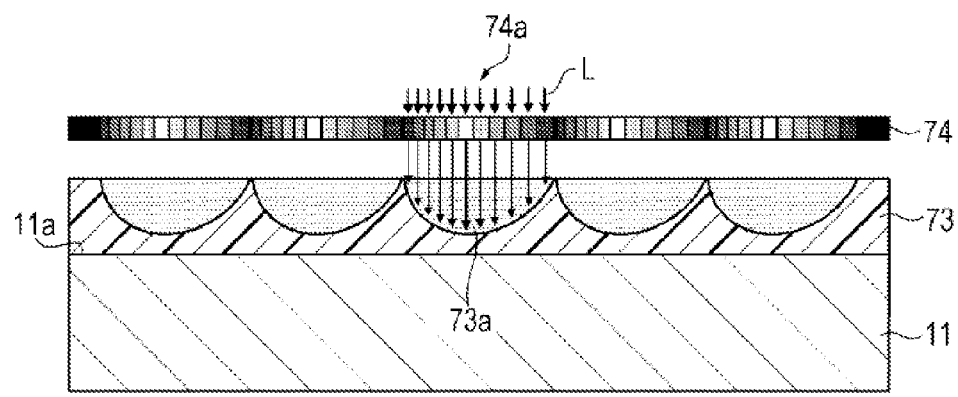

First, as illustrated in FIG. 6A, a resist layer 73 having optical transparency which is formed by quartz, or the like, is formed on the face 11a of the substrate 11. Subsequently, as illustrated in FIG. 6B, exposure processing of the resist layer 73 is performed using a mask 74 in which transmissivity of light is changed on the resist layer 73 in responding to the asymmetric shape of the curved surface of the concave portion 12 which is formed on the substrate 11.

The mask 74 is, for example, a grayscale mask such as an HEBS mask, and grayscale is obtained by differentiating optical transparency in the asymmetric shape from a position of a bottom of the concave portion 12 toward the outer periphery thereof in each light transmission region 74a. By performing irradiation of laser light L through such mask 74, an exposure portion 73a is formed on the resist layer 73 in responding to each of the light transmission regions 74a of the mask 74.

In addition, in the exposure of the resist layer 73, a multistage exposure using a plurality of masks in which an area of the light transmission region is varied in stages in responding to a shape of the concave portion 12 may be used. In addition, an area grayscale mask in which the area distribution of small openings is performed in responding to a shape of the concave portion 12 using a chromium mask may be used.

Figure 6C:
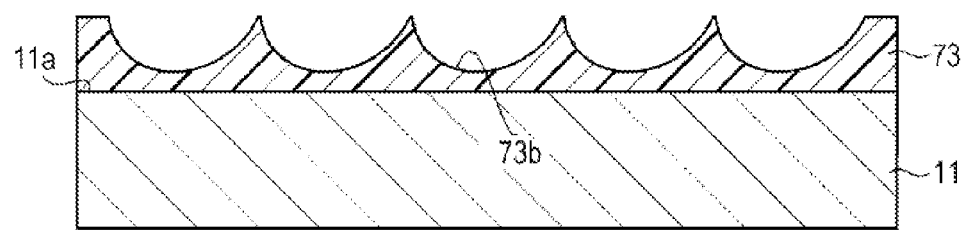

Subsequently, as illustrated in FIG. 6C, the exposure portion 73a is removed by performing development processing on the resist layer 73. In this manner, a concave portion 73b as a base of the concave portion 12 is formed on the resist layer 73. Subsequently, for example, anisotropic etching such as dry etching is performed from the resist layer 73 on which the concave portion 73b is formed to the substrate 11.

Figure 7A:
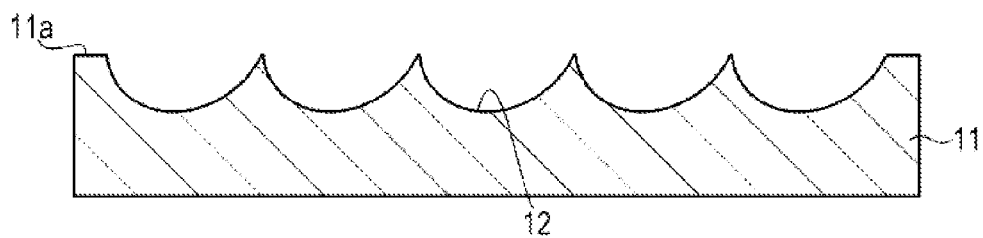
FIGS. 7A to 7C are schematic cross-sectional views which illustrate a method of manufacturing the microlens array substrate according to the first embodiment.

As a result, as illustrated in FIG. 7A, the resist layer 73 is removed, the concave portion 73b which is formed on the resist layer 73 is transferred to the substrate 11, and the concave portion 12 is formed on the substrate 11. In addition, in the anisotropic etching, it is possible to make the concave portions 73b and 12 have the same shape on the condition that the resist layer 73 and the substrate 11 can be etched at approximately the same rate.

Figure 7B:
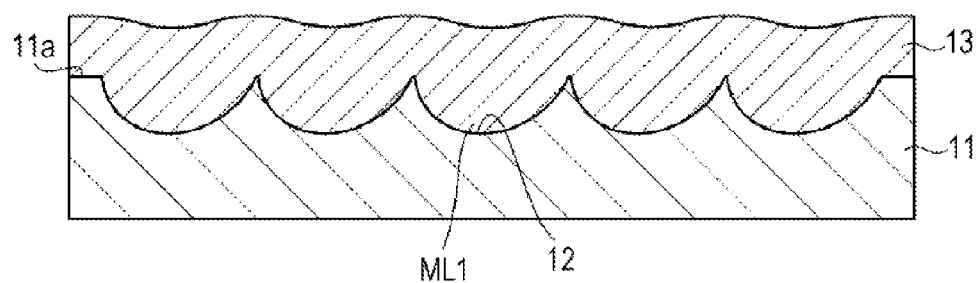

Subsequently, as illustrated in FIG. 7B, the lens layer 13 which has optical transparency, and is formed by an inorganic material having a higher optical refractive index than that of the substrate 11 is formed so as to bury the concave portion 12 which is formed on the substrate 11. The lens layer 13 can be formed using a Chemical Vapor Deposition (CVD) method, for example. In this manner, the microlens ML1 having a positive refractive power is configured in responding to the concave portion 12. A step difference due to the concave portion 12 is reflected on the surface of the lens layer 13.

Figure 7C:
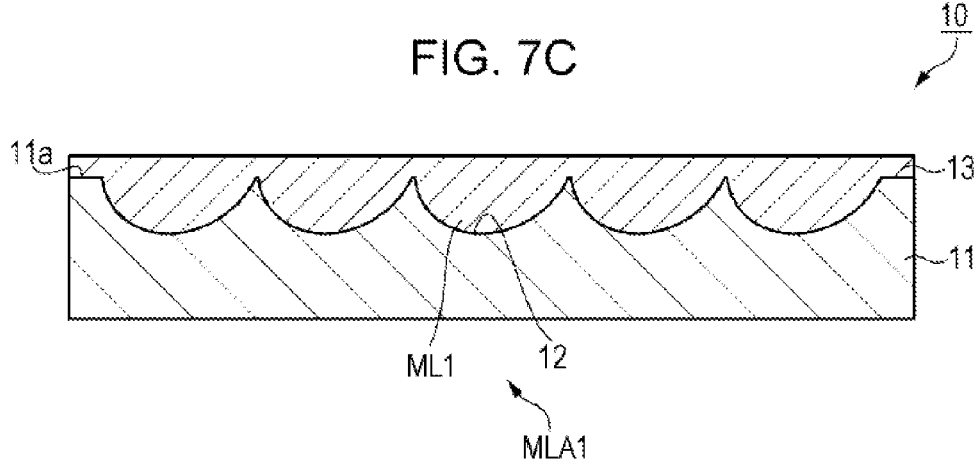

Subsequently, as illustrated in FIG. 7C, planarization processing on the surface of the lens layer 13 is performed using, for example, a Chemical Mechanical Polishing (CMP) processing, or the like. The remaining thickness after the planarization processing of the lens layer 13, that is, the layer thickness of the lens layer 13 is appropriately set based on optical conditions such as a focal distance of the microlens ML which will be formed. In this manner, the microlens array substrate 10 including a microlens array MLA1 is completed.

In addition, in a manufacturing process of the microlens array substrate 60, the lens layer 63 which is formed of an inorganic material having optical transparency, and an optical refractive index which is lower than that of the substrate 61 is formed in a process which is illustrated in FIG. 7B so as to bury the concave portion 62 which is formed in the substrate 61. In this manner, the microlens ML2 having a negative refractive power is configured in responding to the concave portion 62.

Second Embodiment

Electronic Apparatus

Figure 8:
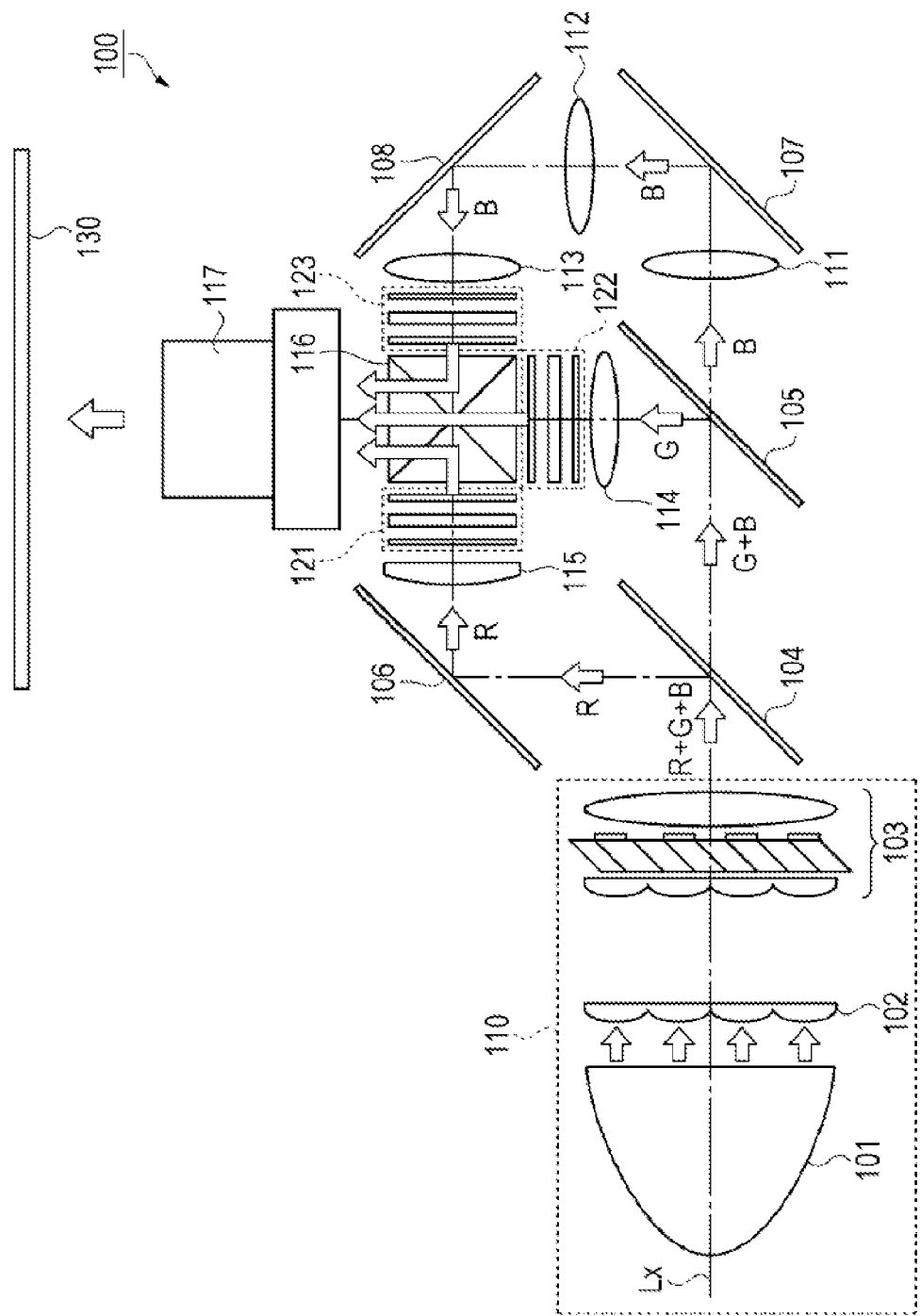
FIG. 8 is a schematic diagram which illustrates a configuration of a projector as an electronic apparatus according to a second embodiment.

Subsequently, an electronic apparatus according to a second embodiment will be described with reference to FIG. 8. FIG. 8 is a schematic diagram which illustrates a configuration of a projector as the electronic apparatus according to the second embodiment.

As illustrated in FIG. 8, a projector (projection type display device) 100 as the electronic apparatus according to the second embodiment includes a polarized light illumination device 110, two dichroic mirrors 104 and 105 as light separation elements, three reflecting mirrors 106, 107, and 108, five relay lenses 111, 112, 113, 114, and 115, three liquid crystal light bulbs 121, 122, and 123, a cross dichroic prism 116 as a photosynthesis element, and a projection lens 117.

The polarized light illumination device 110 includes, for example, a lamp unit 101 as a light source which is formed of a white light source such as an ultrahigh pressure mercury lamp or a halogen lamp, an integrator lens 102, and a polarization conversion element 103. The lamp unit 101, the integrator lens 102, and the polarization conversion element 103 are arranged along a system optical axis Lx.

The dichroic mirror 104 reflects red light (R), and transmits green light (G) and blue light (B) in polarization light flux which is output from the polarized light illumination device 110. One more dichroic mirror 105 reflects the green light (G) which has penetrated the dichroic mirror 104, and transmits the blue light (B).

The red light (R) which has been reflected on the dichroic mirror 104 is input to the liquid crystal light bulb 121 through the relay lens 115 after being reflected on the reflecting mirror 106. The green light (G) which has been reflected on the dichroic mirror 105 is input to the liquid crystal light bulb 122 through the relay lens 114. The blue light (B) which has penetrated the dichroic mirror 105 is input to the liquid crystal light bulb 123 through a light guiding system which is configured of the three relay lenses 111, 112, and 113, and the two reflecting mirrors 107 and 108.

The transmission type liquid crystal light bulbs 121, 122, and 123 as light modulation elements are respectively arranged so as to face an input surface of each colored light of the cross dichroic prism 116. The colored light beams which are input to the liquid crystal light bulbs 121, 122, and 123 are modulated based on image information (image signal), and are output to the cross dichroic prism 116.

The cross dichroic prism 116 is configured by bonding four right-angular prisms, and a dielectric multilayer which reflects red light, and a dielectric multilayer which reflects blue light are formed in a cross shape in the inside thereof. The three colored light beams are synthesized by these dielectric multilayers, and light which denotes a color image is synthesized. The synthesized light is projected onto a screen 130 by the projection lens 117 as the projection optical system, and an image is displayed by being enlarged.

The liquid crystal light bulb 121 is a bulb to which the liquid crystal device 1 including the microlens array substrates 10 and 60 according to the above described embodiment is applied. The liquid crystal light bulb 121 is arranged with a gap between a pair of polarization elements which is arranged in a crossed Nicol state on the input side and output side of the colored light. Other liquid crystal light bulbs 122 and 123 are also similarly arranged.

According to a configuration of a projector 100 according to the second embodiment, since a liquid crystal device 1 in which a use efficiency of light is high even when a plurality of pixels P are arranged in high density, contrast of an image which is projected onto the screen 130 is high, and uneven illuminance is reduced is included, it is possible to provide a high quality projector 100 from which a bright image is obtained.

The above described embodiment is merely one embodiment of the invention, it can be modified, and is applicable arbitrarily in the scope of the invention. As a modification example, for example, the following example can be considered.

Modification Example

In the configuration of liquid crystal device 1 according to the above described embodiment, the microlens ML1 of the microlens array substrate 10 and the microlens ML2 of the microlens array substrate 60 have the same shape, and the apex of the lens layer 63 is located on the side which is opposite to the apex of the lens layer 13 with respect to the normal line N of the substrate 11 which passes through the center of the pixel P, however, the invention is not limited to this configuration. The microlenses ML1 and ML2 may have different shapes as long as the lenses have the same function as that in the above described embodiment.

For example, the lens layer 13 has a curved surface shape which is swollen toward the face 11b side of the substrate 11 to which light is input, and the lens layer 63 has a curved surface shape which is swollen toward the face 61b side of the substrate 61 from which light is output, however, the respective lens layers 13 and 63 may have curved surface shapes which are swollen toward the liquid crystal layer 40 side. Even in such a shape, it is possible to obtain the same effect when the optical refractive index of the lens layer 13 is higher than that of a member which is bonded to the side of the curved surface shape of the lens layer 13, and when the optical refractive index of the lens layer 63 is lower than that of a member which is bonded to the side of the curved surface shape of the lens layer 63.

In addition, it may be a configuration in which, for example, a difference between the optical refractive index of the lens layer 63 in the microlens ML2 of the element substrate 20 and the optical refractive index of the substrate 61 is larger than a difference between the optical refractive index of the lens layer 13 in the microlens ML1 of the counter substrate 30 and the optical refractive index of the substrate 11. By adopting such a configuration, it is possible to make the depth of the concave portion 62 of the microlens ML2 smaller than that of the depth of the concave portion 12 of the microlens ML1. In a manufacturing process of the element substrate 20, the TFT 24 is formed on the microlens array substrate 60 on which the microlens ML2 is formed using a semiconductor process. At this time, there is a concern that flatness on the surface of the microlens array substrate 60 on which the TFT 24 is formed may decrease when the concave portion 62 is deep, or the microlens array substrate 60 may be damaged at because of high temperature in the semiconductor process, for example, due to a crack which occurs on the lens layer 63, or the like. In such a case, it is possible to reduce such a risk by forming the concave portion 62 to be shallow.

The entire disclosure of Japanese Patent Application No. 2013-020160, filed Feb. 5, 2013 is expressly incorporated by reference herein.

What is claimed is:

1. A liquid crystal device comprising:
a first substrate that is arranged on a light input side;
a second substrate that is arranged on a light output side;
a liquid crystal layer that is arranged between the first and second substrates;
a first microlens that is provided on the first substrate such that an optical axis of the first microlens is tilted to a normal line direction of the first substrate;
a second microlens that is provided on the second substrate such that an optical axis of the second microlens is tilted to a normal line direction of the second substrate;
a first light-blocking layer that is provided closer to a liquid crystal layer side than the first microlens, and has a first opening portion in each pixel included in a plurality of pixels; and
a second light-blocking layer that is provided closer to the liquid crystal layer side than the second microlens, and has a second opening portion in each pixel included in the plurality of pixels,
wherein:
a focal point of the first microlens is located beyond a curved surface of the second microlens in a direction away from the liquid crystal layer,
the optical axis of the first microlens and the optical axis of the second microlens are each tilted at approximately a same angle from the normal line direction, and
a section of the first opening portion does not overlap a section of the second opening portion in plan view.

2. The liquid crystal device according to claim 1, wherein the first microlens has a positive refractive power, and the second microlens has a negative refractive power.

3. The liquid crystal device according to claim 1, wherein an edge portion of the first opening portion of the first light-blocking layer and an edge portion of the second opening portion of the second light-blocking layer are each separated from at least one of the optical axis of the first microlens and the optical axis of the second microlens by approximately a same distance.

4. An electronic apparatus comprising:
the liquid crystal device according to claim 1.

5. The liquid crystal device according to claim 1, wherein the optical axis of the first microlens approximately matches the optical axis of the second microlens.

6. The liquid crystal device according to claim 1, wherein an area of the first opening portion is approximately the same as an area of the second opening portion.

* * * * *